(12) United States Patent
Poland et al.

(10) Patent No.: US 9,481,202 B2
(45) Date of Patent: Nov. 1, 2016

(54) PLUG FOR A TUBELESS BICYCLE WHEEL

(71) Applicant: Specialized Bicycle Components, Inc., Morgan Hill, CA (US)

(72) Inventors: Marshall Ellison Poland, Santa Cruz, CA (US); Douglas Graham Russell, Morgan Hill, CA (US); Joseph Edward Buckley, Santa Cruz, CA (US); Jeremy Thompson, Aptos, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 252 days.

(21) Appl. No.: 14/170,105

(22) Filed: Jan. 31, 2014

(65) Prior Publication Data

US 2015/0217597 A1     Aug. 6, 2015

(51) Int. Cl.
*B60B 1/04* (2006.01)
*B60B 21/06* (2006.01)
*B60B 21/12* (2006.01)

(52) U.S. Cl.
CPC ............... *B60B 1/041* (2013.01); *B60B 1/043* (2013.01); *B60B 21/062* (2013.01); *B60B 21/12* (2013.01); *B60B 21/068* (2013.01)

(58) Field of Classification Search
CPC ..... B60B 21/00; B60B 21/02; B60B 21/025; B60B 21/026; B60B 21/04; B60B 21/062; B60B 1/041; B60B 1/043; B60B 1/047; B60B 21/12; B60B 21/068
USPC .................................. 301/95.101, 95.104, 58
See application file for complete search history.

(56) References Cited

U.S. PATENT DOCUMENTS

| | | | |
|---|---|---|---|
| 4,334,632 A * | 6/1982 | Watanabe | B62D 25/24 220/787 |
| 4,998,642 A * | 3/1991 | Kraus | B62D 25/24 220/782 |
| 5,578,491 A | 11/1996 | Kayal et al. | |
| 6,073,327 A | 6/2000 | Inoue et al. | |
| 6,145,937 A * | 11/2000 | Chen | B60B 21/062 301/58 |
| 6,155,651 A * | 12/2000 | Mizata | B60B 1/041 152/381.6 |
| 6,736,462 B1 * | 5/2004 | Okajima | B60B 1/0223 29/894.33 |
| 6,848,752 B1 * | 2/2005 | Tien | B60B 1/041 301/59 |
| 7,104,300 B2 * | 9/2006 | Veux | B60B 21/025 152/379.4 |

(Continued)

FOREIGN PATENT DOCUMENTS

| CN | 203221823 | 10/2013 |
|---|---|---|
| CN | 104108280 | 10/2014 |

(Continued)

*Primary Examiner* — Hau Phan
*Assistant Examiner* — Jacob Meyer
(74) *Attorney, Agent, or Firm* — Michael Best & Friedrich LLP

(57) ABSTRACT

A bicycle wheel is disclosed having a spoke, a nipple coupled to the spoke, and a rim coupled to the nipple and having an annular panel with inner and outer surfaces and an access hole. A plug is positioned over the access hole and includes a cap that is larger than the access hole, a leg extending from the cap and through the access hole, and a barb protruding radially from the leg to at least partially engage the inner surface of the annular panel. The plug can further include a resilient member compressed between the cap and the outer surface of the annular panel. On some rims, the annular panel has a non-planar contour. For these rims, the resilient member and/or the cap can be shaped to match the non-planar contour of the annular panel.

8 Claims, 10 Drawing Sheets

(56) References Cited

U.S. PATENT DOCUMENTS

| | | | | |
|---|---|---|---|---|
| 7,374,250 | B2* | 5/2008 | Fioravanti | B60B 1/041 301/58 |
| 7,431,404 | B2* | 10/2008 | Senoo | B60B 1/041 301/104 |
| 7,487,811 | B2* | 2/2009 | Schelhaas | B60B 1/041 152/381.5 |
| 8,371,789 | B2* | 2/2013 | Takita | B60R 16/0222 220/787 |
| 8,919,606 | B2* | 12/2014 | Sato | B62D 25/24 215/363 |
| 8,978,725 | B2* | 3/2015 | Koshiyama | B60B 21/025 152/381.5 |
| 9,045,932 | B2* | 6/2015 | Laukhuf | E06B 7/22 |
| 2004/0095014 | A1* | 5/2004 | Veux | B60B 21/025 301/58 |
| 2004/0262982 | A1* | 12/2004 | Varrone | B60B 1/041 301/58 |
| 2005/0023883 | A1* | 2/2005 | Okajima | B60B 1/041 301/58 |
| 2005/0189813 | A1* | 9/2005 | Bauer | B60B 21/025 301/95.104 |
| 2006/0108041 | A1* | 5/2006 | Schelhaas | B60B 1/041 152/381.6 |
| 2007/0029869 | A1* | 2/2007 | Senoo | B60B 1/041 301/95.104 |
| 2012/0073544 | A1* | 3/2012 | McClendon | F02D 9/1035 123/434 |
| 2013/0099556 | A1* | 4/2013 | Koshiyama | B60B 21/025 301/95.104 |
| 2013/0219798 | A1* | 8/2013 | Sato | B62D 25/24 49/463 |

FOREIGN PATENT DOCUMENTS

| | | |
|---|---|---|
| DE | 202007010082 | 2/2008 |
| EP | 1619043 | 1/2006 |
| WO | 02/32695 | 4/2002 |
| WO | 03/026905 | 4/2003 |
| WO | 2006070415 | 7/2006 |

* cited by examiner

US 9,481,202 B2

PLUG FOR A TUBELESS BICYCLE WHEEL

BACKGROUND

The present invention relates generally to the field of bicycles and specifically to parts for tubeless bicycle wheels.

Bicycle wheels commonly include an axle, a hub rotatable on the axle, spokes extending radially from the hub, a rim supported by the spokes, a tire, and a pneumatic tube positioned inside the tire to facilitate inflation of the tire. The rim typically includes spoke holes that facilitate insertion of and access to spoke nipples that connect the rim to the spokes.

Some wheels are called "tubeless" because they eliminate the pneumatic tube. In these wheels, the tire and rim are designed to hold air to thereby allow the tire to be inflated without the need for a tube. In tubeless wheels, any holes in the rim (e.g., spoke holes) must be pneumatically sealed to prevent the loss of air.

SUMMARY

The present invention provides a bicycle wheel having a spoke, a nipple coupled to the spoke, and a rim coupled to the nipple and having an annular panel with inner and outer surfaces. The annular panel includes an access hole defining inner and outer edges corresponding with the inner and outer surfaces, the access hole having a hole area sized to facilitate passage of the nipple. A plug is positioned over the access hole and includes a cap having a cap area larger than the hole area, a leg (e.g., a plurality of legs) extending from the cap and through the access hole, and a barb (e.g., a plurality of barbs) protruding radially from the leg to at least partially engage the inner edge of the annular panel.

In one embodiment, the plug further includes a resilient member (e.g., an O-ring made of a softer material than the cap) compressed between the cap and the outer surface of the annular panel. The resilient member has a stressed thickness when compressed between the cap and the outer surface, and the stressed thickness is 50 to 95 percent (preferably 70 to 85 percent, and most preferably about 80 percent) of the unstressed thickness. On some rims, the annular panel has a non-planar contour. For these rims, the resilient member and/or the cap can be shaped to match the non-planar contour of the annular panel.

Preferably, the cap has a cap width and the leg has a circumferential width that is less than half the cap width. In addition, the barb can include a contact surface (that engages the inner edge of the annular panel) that is at an obtuse angle relative to the leg. To provide strength, the cap can include a center that has a thickness greater than an edge of the cap and/or the plug can include a reinforcement rib. In order to align the plug relative to the rim, the plug can include an alignment feature. In order to facilitate removal of the plug from the rim, the plug can include an engagement feature.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
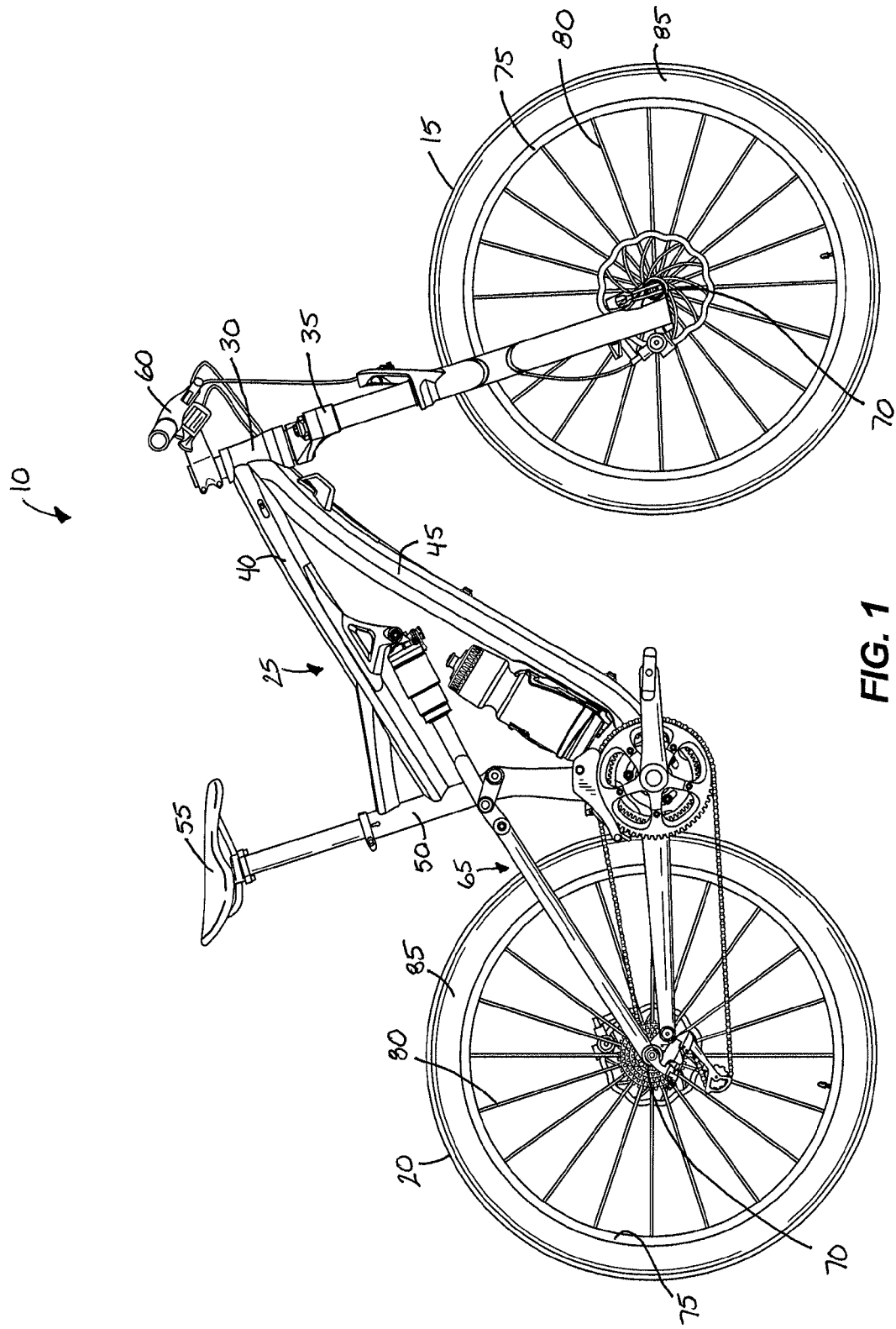
FIG. 1 is a side view of a bicycle including tubeless wheels embodying the invention.

FIG. 1 shows a bicycle 10 that includes a front wheel 15, a rear wheel 20, and a frame 25. The frame 25 has a head tube 30, a front fork 35 rotationally supported by the head tube 30, a top tube 40 connected to and extending rearward from the head tube 30, and a down tube 45 connected to the head tube 30 below the top tube 40 and extending generally downward toward a bottom bracket (not shown) of the frame 25. A seat tube 50 extends upward from the bottom bracket and is connected to the top tube 40, and a seat 55 is supported by the seat tube 50. The bicycle 10 also includes a handlebar 60 for turning the front wheel 15 via the fork 35, and a rear frame triangle 65 that supports the rear wheel 20.

Figure 2:
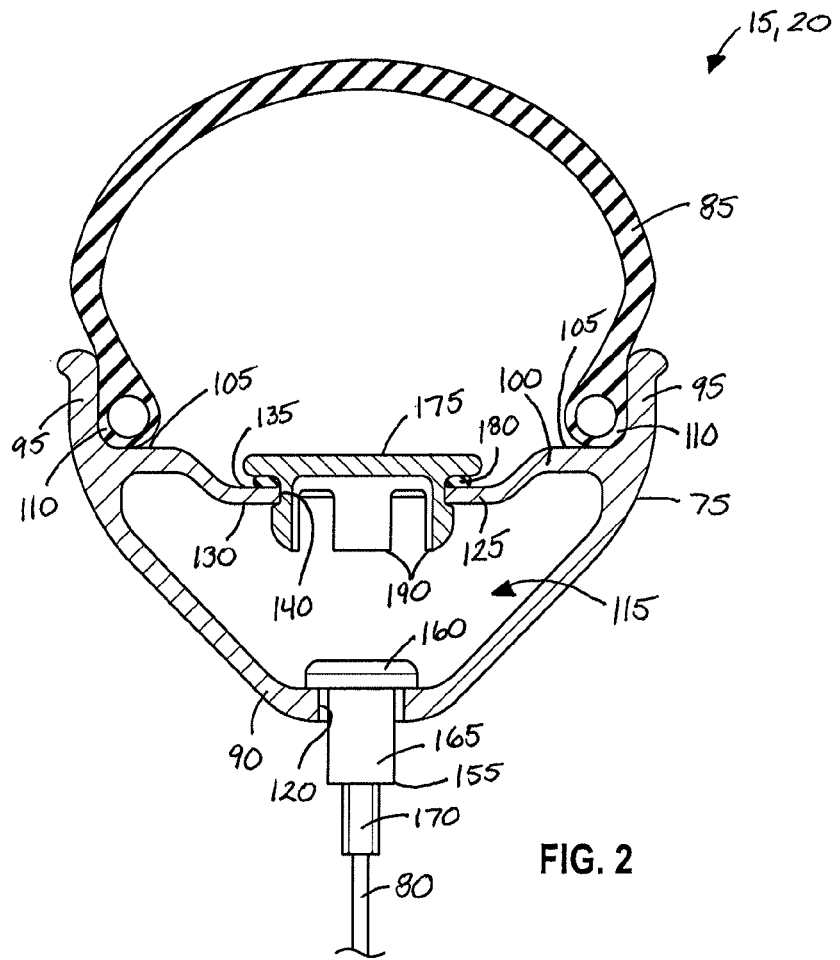
FIG. 2 is a section view of a rim, a tire, and a plug of one tubeless wheel of FIG. 1.
Figure 3:
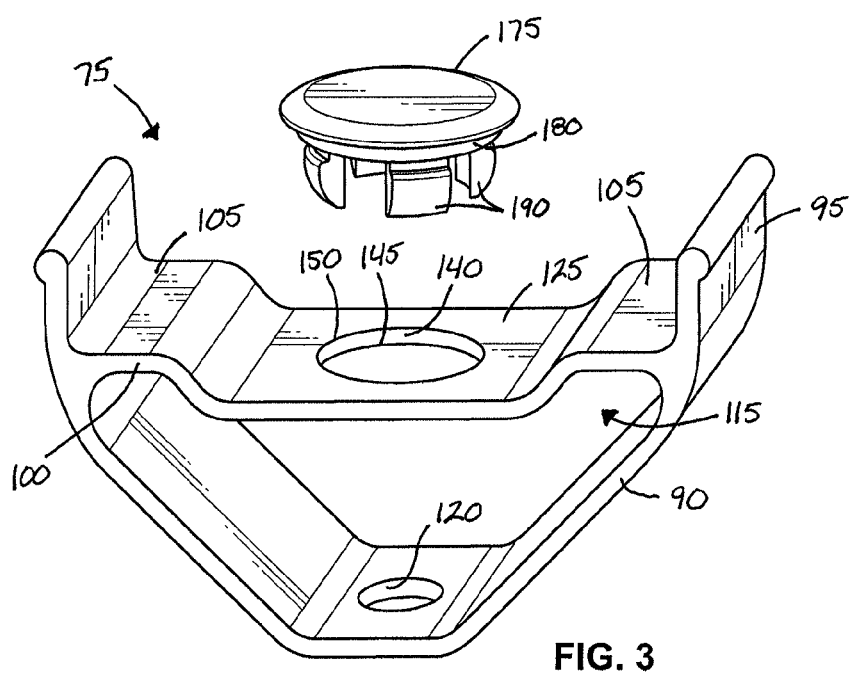
FIG. 3 is an exploded perspective view of a portion of the rim and the plug of FIG. 2.

Referring to FIGS. 1-3, each illustrated wheel 15, 20 includes a hub 70, a reinforced rim 75 supported by the hub 70 via spokes 80 (or other reinforcement members), and a tire 85 that is attached to the rim 75. The rim 75 is annular and can be formed of metallic, composite, or other material. The illustrated rim 75 has an annular inner wall 90, annular outer walls 95, and an annular outer panel 100. The annular panel 100 extends between and is connected to the inner wall 90 and the outer walls 95. As shown, the panel 100 defines bead seats 105 that support tire beads 110, and the outer walls 95 and the panel 100 cooperatively define tire 85 engaging portions that support and retain the tire 85 on the rim 75 when the tire 85 is inflated. Although FIGS. 2 and 3 illustrate that the outer walls 95 extend substantially (e.g.

almost completely) radially outward and that the panel 100 has planar bead seats 105, it will be appreciated that the rim 75 can have other profiles.

As illustrated, the inner wall 90 and the panel 100 cooperatively define a cavity 115. The inner wall 90 has a plurality of openings 120 spaced circumferentially along the periphery of the wall, and distal ends of the spokes 80 extend nearly to or into the cavity 115 through the openings 120. The panel 100 has an annular recessed section or drop-center 125 with an annular inner surface 130, an annular outer surface 135, and circumferentially spaced holes 140 through which the spokes 80 can be accessed. The holes 140 are radially aligned with the openings 120 in the inner wall 90 and are defined by an inner edge 145 and an outer edge 150. Although the drop-center 125 illustrated in FIGS. 2 and 3 has a planar contour in cross-section, the drop-center 125 can have other profiles or contours (e.g., curved, angled, etc.).

The illustrated spokes 80 are secured to the rim 75 by nipples 155 (e.g., threaded to the spokes 80). Each nipple 155 has a head 160 and a body 165 engageable with the distal end of the spoke 80 to secure the spoke 80 to the rim 75. The nipple head 160 has a diameter or width that is less than the diameter of the access hole 140 to facilitate passage of the nipple 155 through the hole. As shown, the body 165 has flattened surfaces 170 for engagement by a tool (e.g., a spoke wrench) to facilitate tightening the spoke. Although the illustrated spokes 80 are attached to the rim 75 by the nipples 155, the spokes 80 can be secured to the inner wall 90 by any suitable arrangement.

The illustrated rim 75 is a tubeless rim that seals to the tire 85 without a separate pneumatic inner-tube. In order to accomplish this, the holes 140 must be sealed (e.g., hermetically) to substantially prevent air leakage when the tire 85 is inflated. With reference to FIGS. 2-5, each wheel 15, 20 includes a plug 175 (e.g., formed of plastic or composite material) and a resilient member or seal 180 that are positioned over the access holes 140 to prevent or minimize air leakage through the holes 140 and the openings 120.

The illustrated plug 175 includes a cap 185 and legs 190 extending from the cap 185 circumferentially around the cap 185. The cap 185 illustrated in FIGS. 2-5 has a planar upper surface 195 and a planar lower surface 200, and is defined by a circular top profile with a cap width W1 (e.g., the diameter of the cap 185). The cap width W1 is larger than a width of the holes 140. As shown in FIG. 2, only the legs 190 extend into and through the hole 140. That is, the cap 185 extends across the hole 140 and does not extend into the hole 140.

With continued reference to FIGS. 2-5, the legs 190 extend from the lower surface 200, have a circumferential width W2, and are spaced apart from each other around the periphery of the cap 185 such that gaps 205 are defined between the legs 190. The illustrated leg width W2 is approximately less than half of the cap width W1, although the cap 185 and the leg 190 can have other relational width values. The illustrated plug 175 includes four legs 190, although fewer or more legs 190 are possible.

Figure 4:
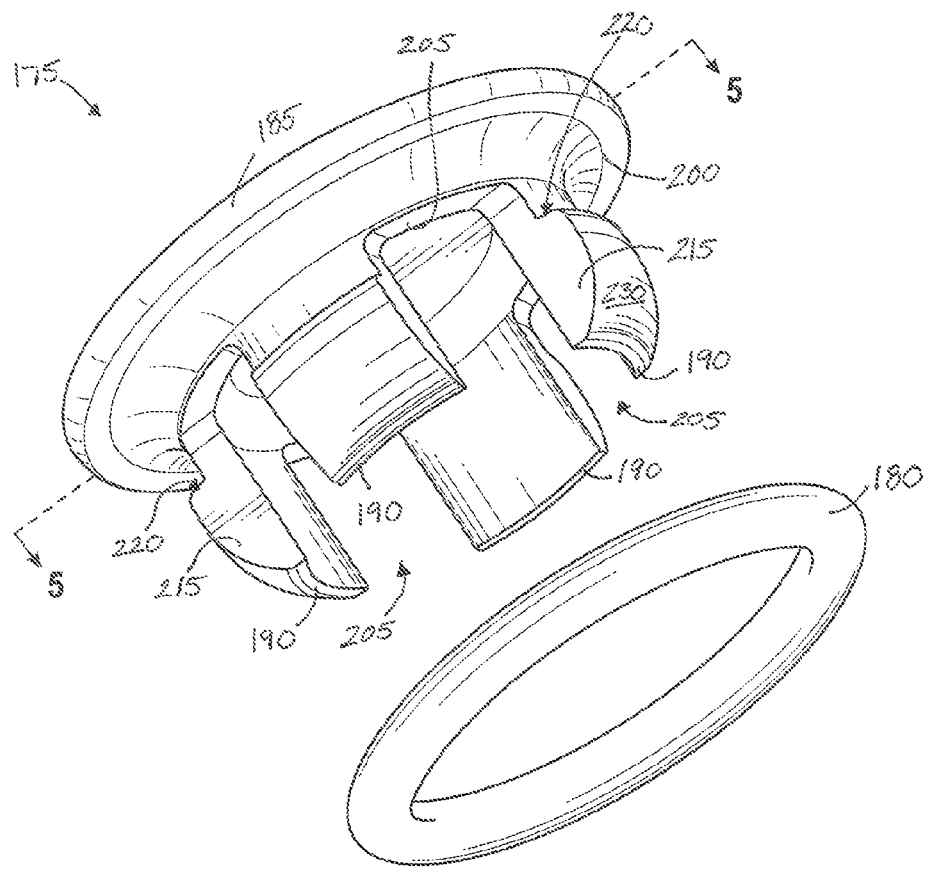
FIG. 4 is an exploded perspective view of the plug and a seal for the wheel of FIG. 1.
Figure 5:
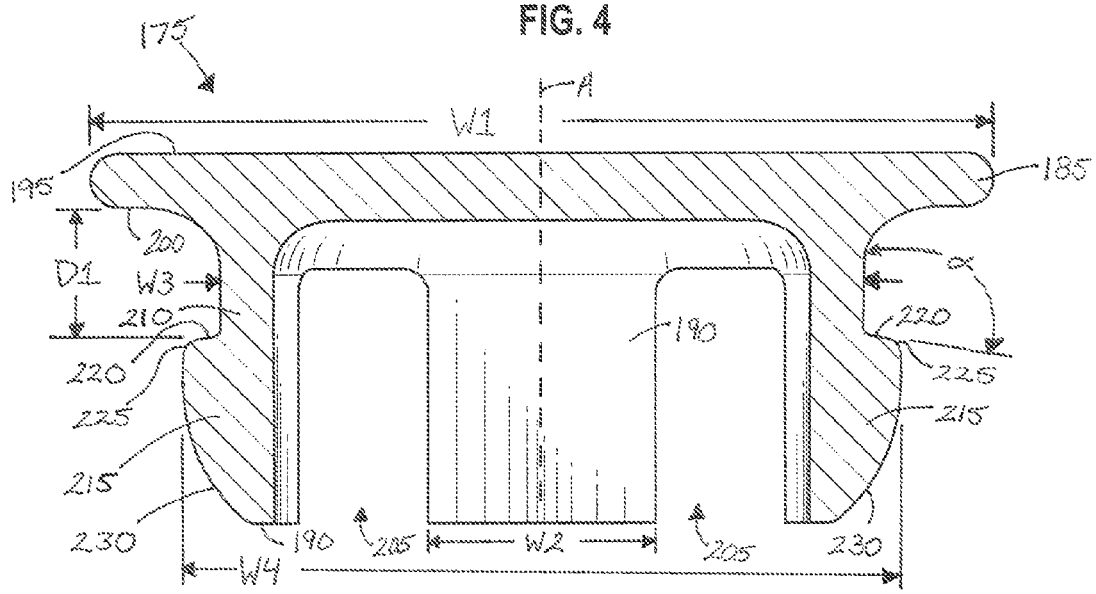
FIG. 5 is a section view of the plug of FIG. 4 taken along line 5-5.

FIGS. 2-5 show that the legs 190 cooperatively define a snap-feature that is engageable with the inner surface 130 to secure the plug 175 and the seal 180 onto the annular panel 100. In particular, each leg 190 has a thin section 210 and a barb 215 radially protruding from the thin section 210 to engage the inner edge 225 145 of the annular panel 100 when the plug 175 is inserted through the hole. With reference to FIG. 5, the thin sections 210 cooperatively define a diameter or width W3 that substantially conforms to (e.g., is the same or slightly smaller than) the diameter or width of the holes 140, and the barbs 215 cooperatively define a diameter or width W4 that is larger than the diameter of width of the holes 140. As illustrated, the cap width W1 is larger than the cooperative width W3 of the legs 190 and larger than the cooperative width W4 of the barbs 215.

Each barb 215 has a contact surface 220 that is spaced from the lower surface 200 by a distance D1, which corresponds to the thickness of the annular panel 100 and a stressed thickness of the seal 180, as described in detail below. Referring to FIG. 5, the illustrated contact surface 220 has a sloped edge 225 and is oriented at an obtuse angle relative to the exterior surface of the thin section 210 (illustrated as vertical in FIG. 5) extending along the leg. The contact surface 220 is also oriented at the same obtuse angle relative to an axis A extending axially through the plug 175. That is, the contact surface 220 is sloped (planar or curved) slightly downward as viewed in FIG. 5 and can also have a rounded or sloped edge 225. The barb 215 is thicker than the remainder of the leg 190 such that the leg, with the barb, flexes at the thin section 210 of the leg 190 (i.e. along the portion of the leg 190 defining the distance D1) as the plug 175 is being inserted into the hole 140. Each barb 215 also is illustrated as having an outer circumferential surface 230 that slopes downward and toward the axis A.

As shown, the illustrated seal 180 is a resilient O-ring that has an inner diameter conforming to the diameter W3 of the thin sections 210 of the legs 190. The seal 180 is made of material that is softer than the plug 175 and is compressible. The seal 180 has an unstressed thickness corresponding to a state when the plug 175 is not engaged with the panel 100, and a stressed thickness when the seal 180 is compressed between the cap 185 and the outer surface 135. For example, the stressed thickness can be 50 to 95 percent of the unstressed thickness. Preferably, the stressed thickness is approximately 70 to 85 percent of the unstressed thickness, and more preferably, about 80 percent of the unstressed thickness.

Referring to FIGS. 2-4, each plug 175 is secured to the hole 140 in the rim 75 by assembling the seal 180 onto the plug 175 and then inserting the legs 190 through the hole 140. The shape or contour of the legs 190 flex inward so that the barbs 215 can fit through the hole 140. The cap 185 is pressed downward so that the contact surface 220 is engaged with the inner edge 145. During and upon engagement, the seal 180 is compressed to the stressed thickness by the cap 185 and the upper surface 195 so that the plug 175 tightly fits into and seals the hole 140. As shown in FIG. 2, the top of the cap 185 is below or approximately no higher (or radially outward) than the bead seats 105 (e.g., to avoid interfering with the tire beads 110).

The plug 175 illustrated in FIGS. 2-5 is removable and re-usable. To remove the plug 175, the edge 225 or lip of the cap 185 is grasped to pull the plug 175 radially outward (upward as viewed in FIG. 2). Because the contact surface 220 is oriented at an obtuse angle and the edge 225 is rounded, the force pulling on the legs 190 resiliently biases the barbs 215 inward until the barbs 215 fit through the hole 140.

Figure 6:
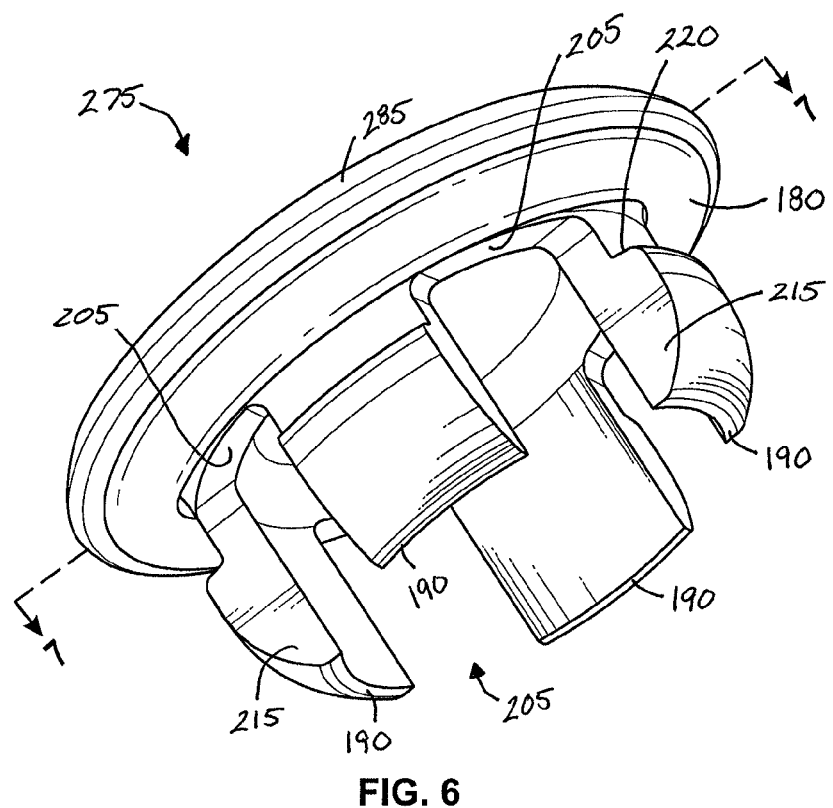
FIG. 6 is a perspective view of another exemplary plug and a seal for a tubeless wheel.
Figure 7:
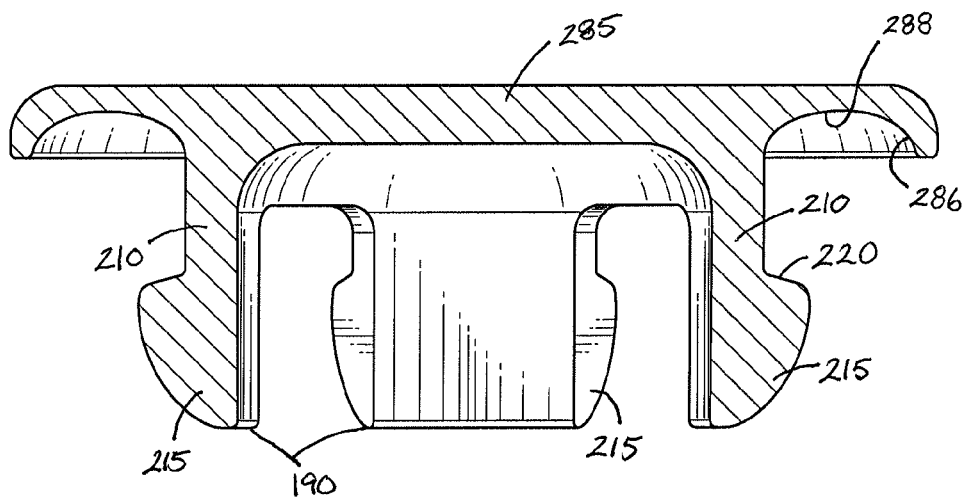
FIG. 7 is a section view of the plug of FIG. 6, without the seal, taken along line 7-7.

FIGS. 6 and 7 illustrate another plug 275 that can be used with the front and rear wheels 15, 20, or another tubeless wheel. Except as described below, the plug 275 is the same as the plug 175 described with regard to FIGS. 2-5 and common elements are given the same reference numerals. The illustrated plug 275 includes a cap 285 that has an annular recess 286 disposed in the lower surface 200. The recess 286 is defined by a curved surface 288 that conforms to the rounded cross-sectional shape of the seal. The illustrated seal is partially embedded in the recess to sealingly engage the outer surface. For example, the illustrated seal 180 can be separably coupled to the plug, or integrally formed with the plug 275 within the recess 286 (e.g., co-formed, co-molded, adhered, etc.).

Figure 8:
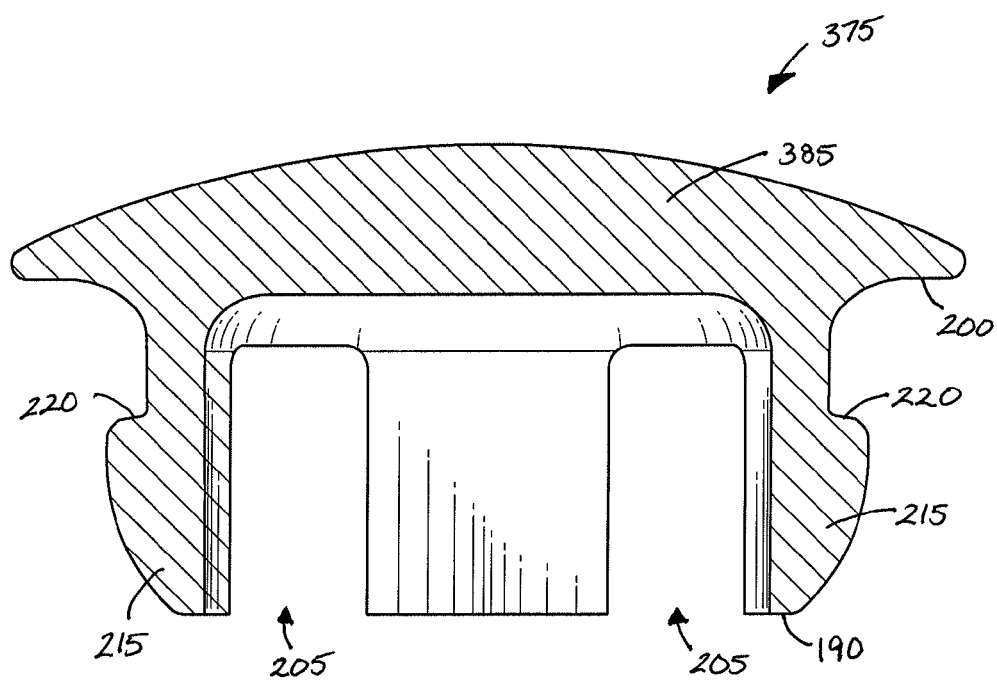
FIG. 8 is a section view of another exemplary plug for a tubeless wheel.

FIG. 8 illustrates another plug 375 that can be used with the front and rear wheels 15, 20, or another tubeless wheel. Except as described below, the plug 375 is the same as the plug 175 described with regard to FIGS. 2-5 and common elements are given the same reference numerals. The illustrated plug 375 includes a domed or non-planar cap 385 to resist breakage or failure of the plug 375, for example, due to high tire air pressures (e.g., high operating air pressures or blowout air pressures). The non-planar cap 385 has a center thickness that is greater than the thickness of the edge. The domed cap 385 supports the center of the plug 375 to avoid collapse within the hole 140 due to higher air pressures.

Figure 9:
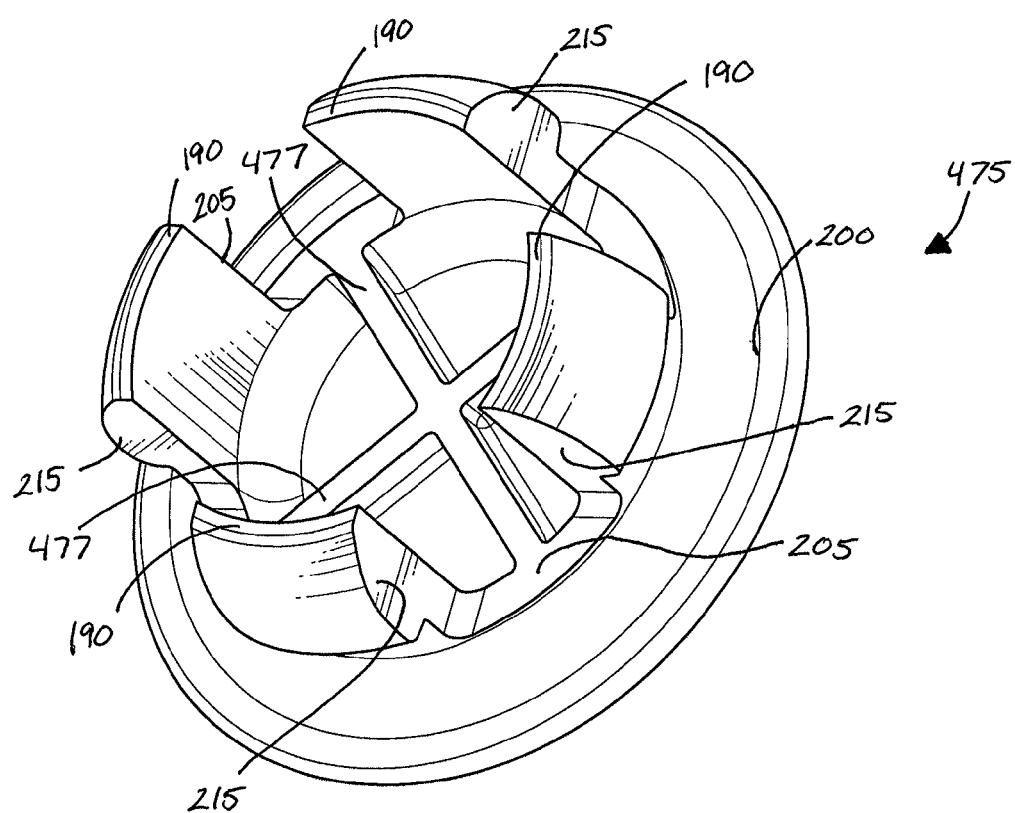
FIG. 9 is a perspective view of another exemplary plug for a tubeless wheel.

FIG. 9 illustrates another plug 475 that can be used with the front and rear wheels 15, 20, or another tubeless wheel. Except as described below, the plug 475 is the same as the plug 175 described with regard to FIGS. 2-5 and common elements are given the same reference numerals. The illustrated plug 475 includes reinforcement ribs 477 that crisscross the lower surface 200 of the cap 185. As illustrated, the ribs 477 intersect each other at or adjacent the center of the cap 185 and are aligned between the barbs 215 to avoid increasing the stiffness of the barbs 215. That is, the ends of the ribs 477 are terminate on the underside of the cap 185 between the legs 190 (i.e. at the gaps 205). The ribs 477 stiffen the plug 475 to resist failure if subjected to higher air pressure.

Figure 10:
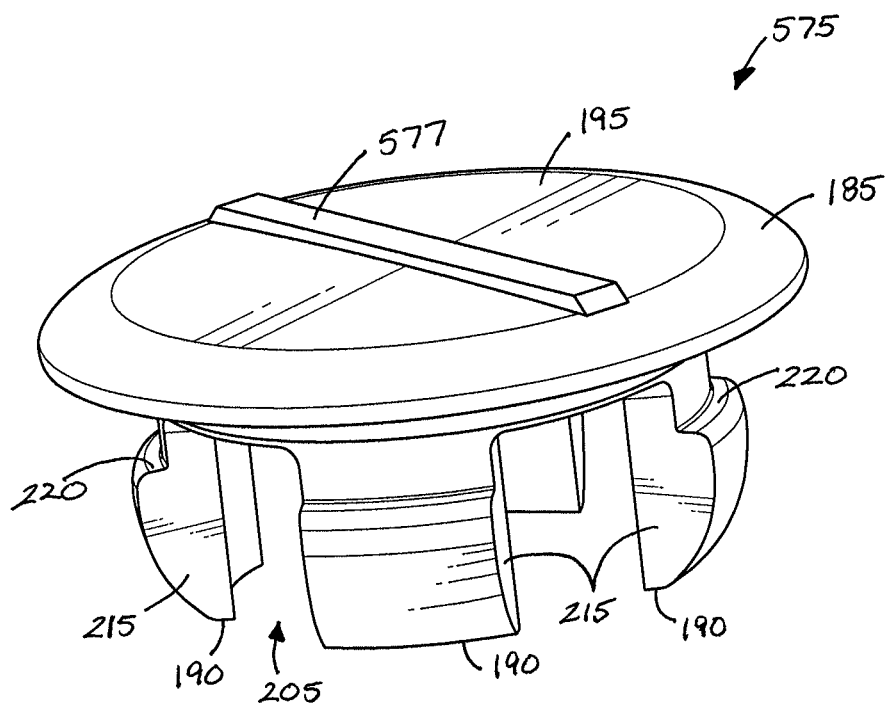
FIG. 10 is a perspective view of another exemplary plug for a tubeless wheel.

FIG. 10 illustrates another plug 575 that can be used with the front and rear wheels 15, 20, or another tubeless wheel. Except as described below, the plug 575 is the same as the plug 175 described with regard to FIGS. 2-5 and common elements are given the same reference numerals. The illustrated plug 575 has an alignment feature 577 to indicate the direction in which the plug 575 should be installed on the rim 75 (e.g., for rims with non-planar drop-centers). As illustrated, the alignment feature 577 is a rib that defines a raised line with ends terminating directly above opposed gaps 205, although the alignment feature 577 can be a recess or another feature that facilitates alignment of the plug 575 relative to the rim 75.

Figure 11:
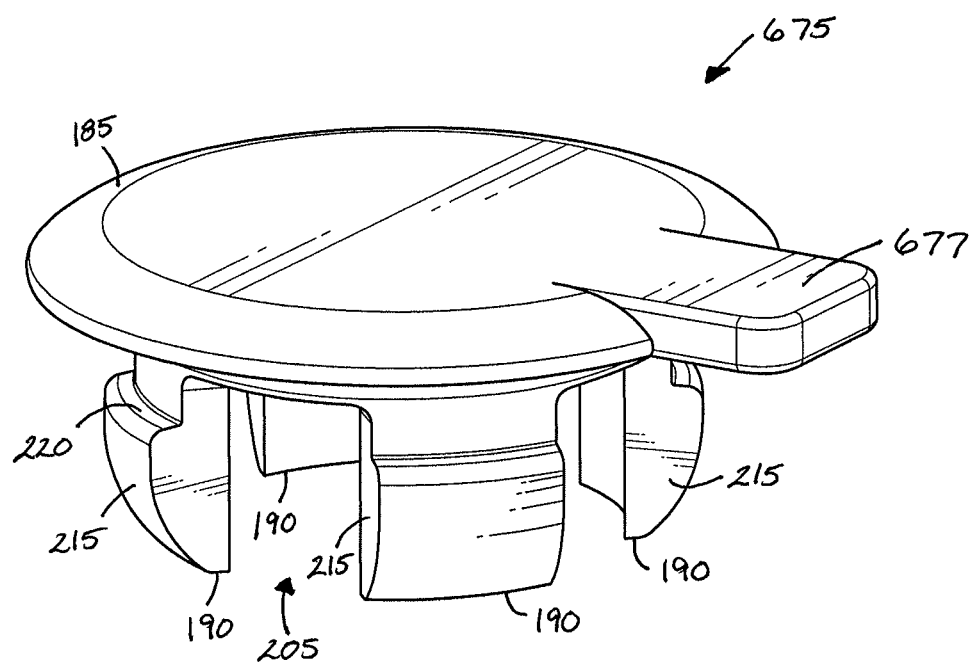
FIG. 11 is a perspective view of another exemplary plug for a tubeless wheel.

FIG. 11 illustrates another plug 675 that can be used with the front and rear wheels 15, 20, or another tubeless wheel. Except as described below, the plug 675 is the same as the plug 175 described with regard to FIGS. 2-5 and common elements are given the same reference numerals. The illustrated plug 675 includes an engagement feature 677 to facilitate removal of the plug 675 from the rim 75 while avoiding damage to the edge of the cap 185. The engagement feature 677 can also be used as an alignment feature (e.g., similar to feature 577) to orient the plug 675 relative to the rim 75. Although the engagement feature 677 is illustrated as a tab in FIG. 11, the engagement feature 677 can take other forms.

Figure 12:
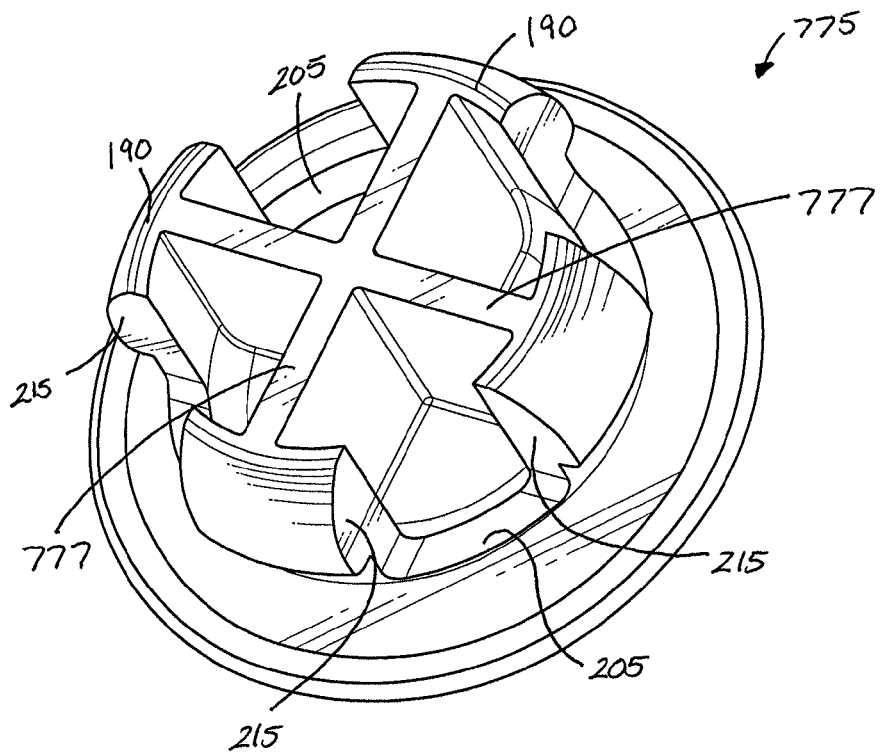
FIG. 12 is a perspective view of another exemplary plug for a tubeless wheel.
Figure 13:
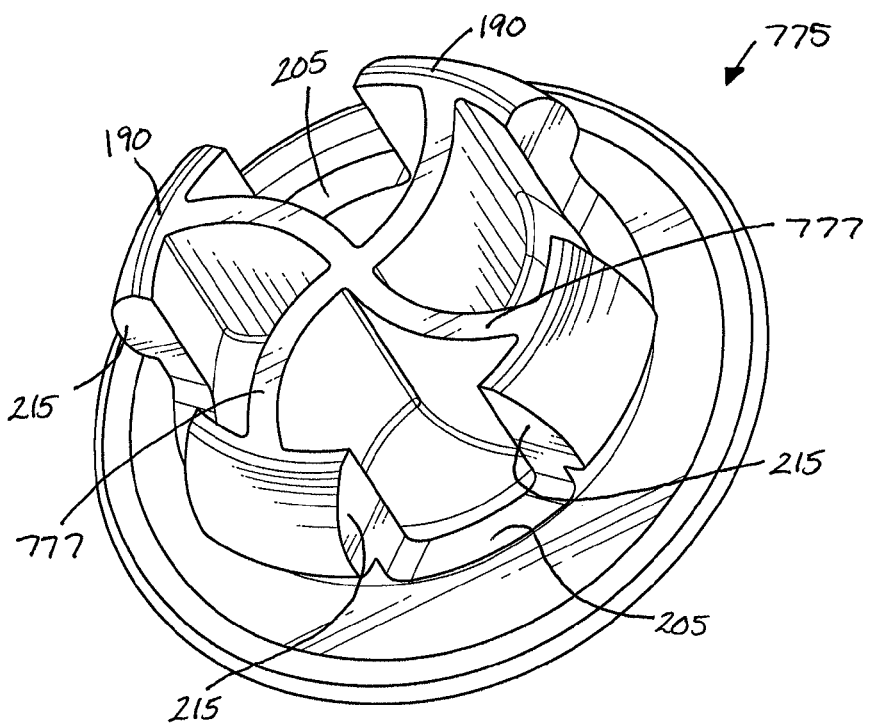
FIG. 13 is a perspective view of another exemplary plug for a tubeless wheel.

FIGS. 12 and 13 illustrate another plug 775 that can be used with the front and rear wheels 15, 20, or another tubeless wheel. Except as described below, the plug 775 is the same as the plug 175 described with regard to FIGS. 2-5 and common elements are given the same reference numerals. The illustrated plug 775 includes cross-braces or reinforcement ribs 777 (referred to as "reinforcement ribs for purposes of description only) that are coupled between opposite barbs 215. The reinforcement ribs 777 act like springs to assist with flexing or resiliently pushing the barbs 215 back into place and to limit flexure of the barb 215 itself. In other words, the reinforcement ribs 777 help maintain the overall shape of the plug 775, and more specifically, the profile of the barbs 215, when the plug 775 is installed in the hole 140. As shown in FIG. 12, the reinforcement ribs 777 can be straight and intersect with each other at the center of the cap 185. As shown in FIG. 13, the reinforcement ribs 777 can instead be curved (e.g., sinusoidal) between the barbs 215 (e.g., to promote flexure of the legs 190 when the plug 775 is installed or removed). Although the reinforcement ribs 777 are illustrated as being formed with the remainder of the plug 775, the reinforcement ribs can be co-formed or co-molded onto the plug 775.

Figure 14:
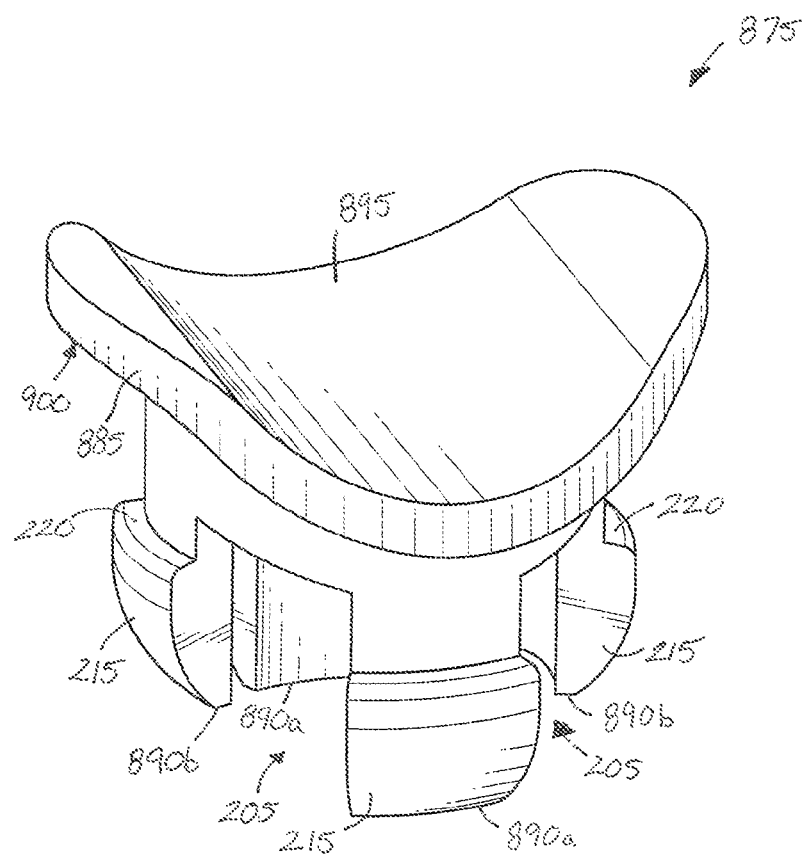
FIG. 14 is a perspective view of another exemplary plug for a tubeless wheel.
Figure 15:
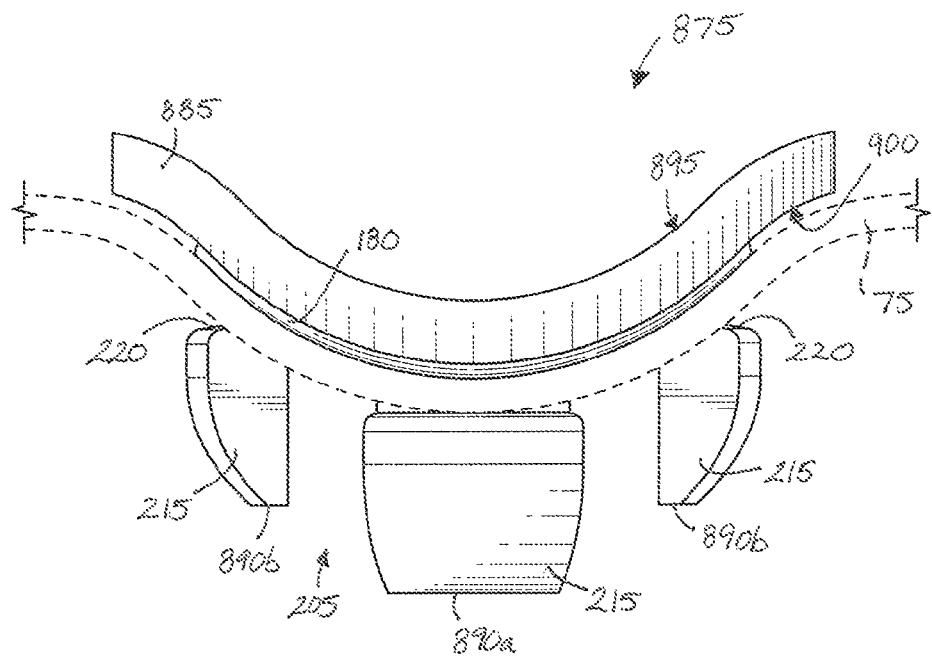
FIG. 15 is a side view of the plug of FIG. 14.

FIGS. 14 and 15 illustrate another plug 875 that can be used with the front and rear wheels 15, 20, or another tubeless wheel. Except as described below, the plug 875 is the same as the plug 175 described with regard to FIGS. 2-5 and common elements are given the same reference numerals. The illustrated plug 875 can be used on rims 75 that have a narrower (e.g., curved) drop-center. More specifically, the plug 875 includes a non-planar cap 885 and legs 890a, 890b. The non-planar cap 885 conforms to the shape of rims with a curved drop-center. The cap 885 is illustrated as having a curvature with the bottom-most part of the curve located at the center of the cap 885. That is, upper and lower surfaces 895, 900 follow the same arcuate contour to define a cap 885 with a substantially constant thickness. The outermost edges of the cap 885 curve upward to conform to the corresponding upwardly-sloped drop-center (not shown). The legs 890a have contact surfaces 220 that are on one plane, and the legs 890b have contact surfaces 220 that are on another, different plane to accommodate the narrower drop-center. The seal 180 is engaged with the plug 875 so that the seal 180 follows the curvature of the lower surface 900.

Figure 16:
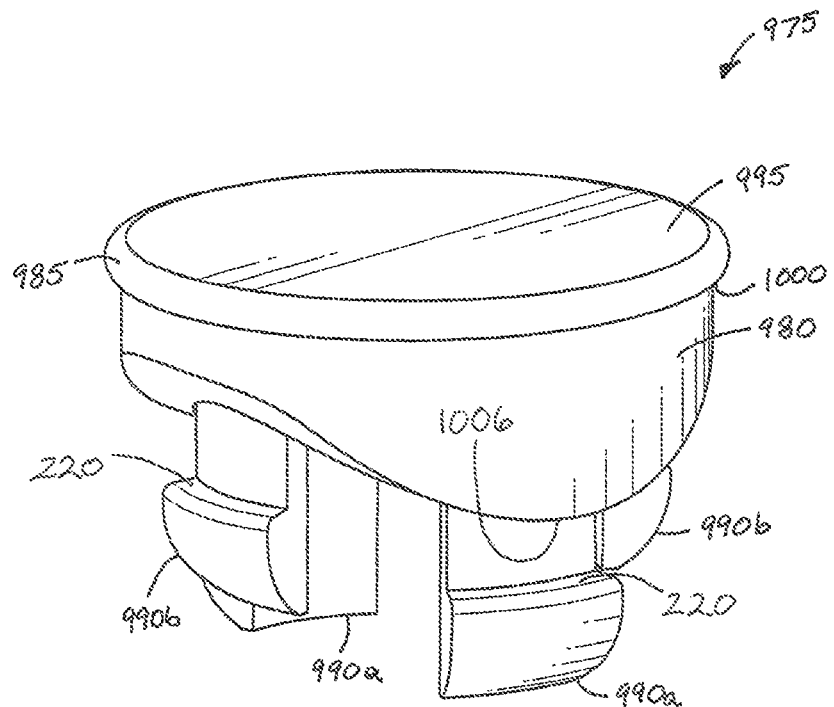
FIG. 16 is a perspective view of another exemplary plug and a seal for a tubeless wheel.
Figure 17:
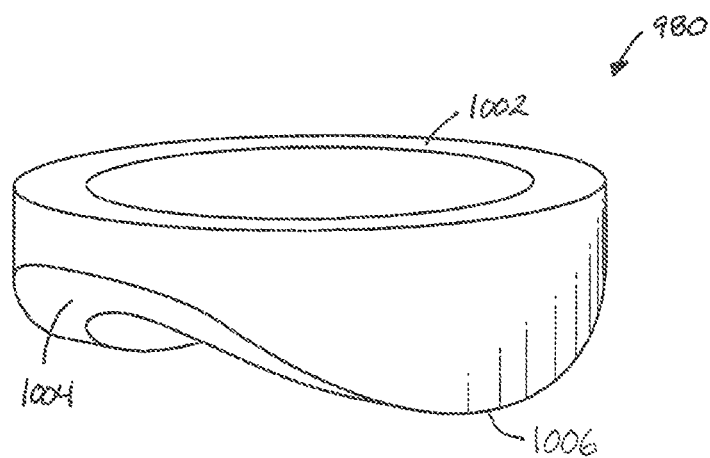
FIG. 17 is a perspective view of the seal of FIG. 16.

FIGS. 16 and 17 illustrate another plug 975 and seal 980 that can be used with the front and rear wheels 15, 20, or another tubeless wheel. Except as described below, the plug 975 is the same as the plug described with regard to FIGS. 2-5 and common elements are given the same reference numerals. The illustrated plug 975 can be used on rims that have a narrower drop-center. The illustrated plug 975 has two sets of legs 990a, 990b and planar upper and lower surfaces 995, 1000. The seal 980 has an upper planar surface 1002 and a lower curved surface 1004 that follows or conforms to the profile of the drop-center. One set of legs 990a is longer than the other set of legs 990b to accommodate the curvature of the drop-center 125. As shown, the seal 980 wraps around the legs 990a, 990b such that the distance between the curved surface 1004 and the contact surface 220 is the same or approximately the same for each leg 990a, 990b. As will be appreciated, the plug 975 and the seal 980 are attached to the rim within the drop-center so that the lowermost part 1006 of the seal 980 is positioned in engagement with the lowermost part of the drop-center.

Figure 18:
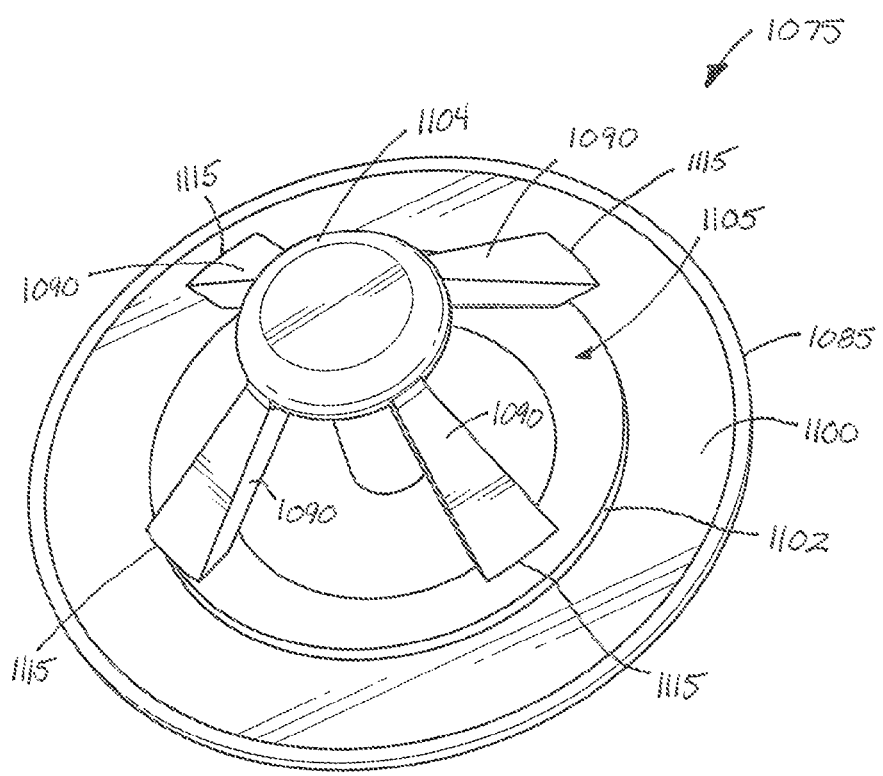
FIG. 18 is a perspective view of another exemplary plug for a tubeless wheel.
Figure 19:
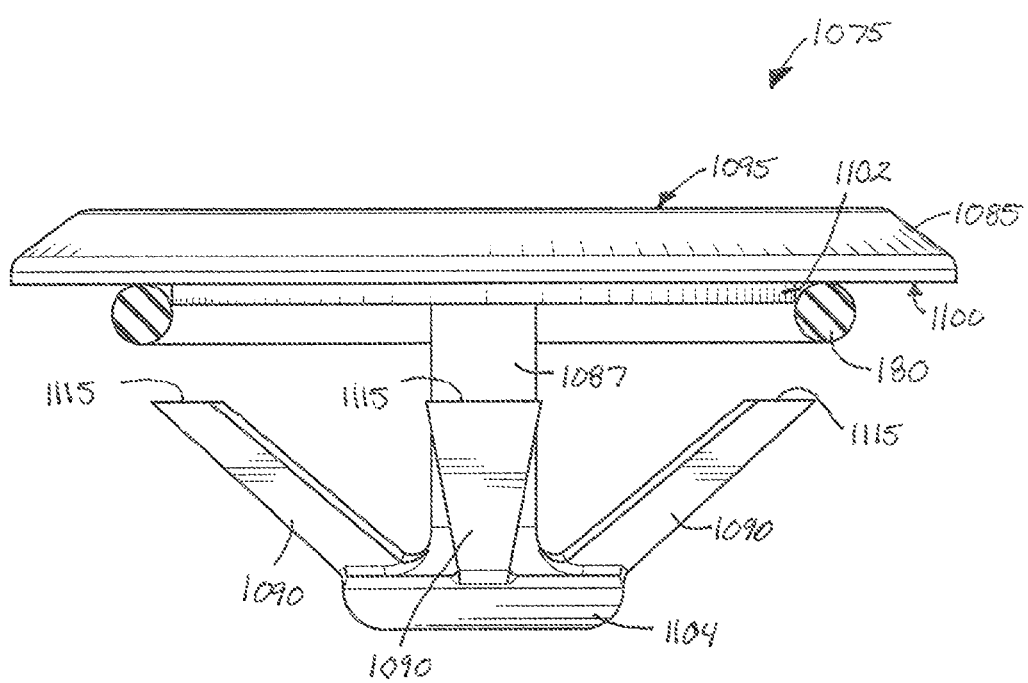
FIG. 19 is a side view of the plug of FIG. 18.

FIGS. 18 and 19 illustrate another plug 1075 that can be used with the front and rear wheels 15, 20, or another tubeless wheel. Except as described below, the plug 1075 is the same as the plug 175 described with regard to FIGS. 2-5 and common elements are given the same reference numerals. The illustrated plug 1075 includes a cap 1085, a post 1087 extending from the cap 1085 at or adjacent the center of the cap 1085, and legs 1090. The cap 1085 illustrated in FIGS. 18 and 19 has a frusto-conical profile or contour with a planar upper surface 1095 and a planar lower surface 1100.

The cap 1085 also has a cylindrical wall 1102 with a width or diameter that is larger than the post 1087 and that is smaller than the width of the cap 1085. The seal 180 is coupled to the plug 1075 such that the inner side of the seal 180 is engaged with the cylindrical wall 1102. The illustrated cylindrical wall 1102 defines a surface that limits further inward movement of the seal 180 when the seal 180 is compressed.

The post 1087 terminates at a central head 1104 on the distal end, and legs 1090 extend upward and outward from the central head 1104. The legs 1090 are spaced apart from each other around the central head 1104 such that gaps 1105 are formed between the legs 1090. As illustrated, the legs 1090 taper wider in width with increasing distance from the central head 1104 along the legs 1090. The barbs 1115 are integrally defined on the distal ends of the legs 1090 to engage the inner surface 130 and hold the plug 1075 in place on the rim 75. The illustrated plug 1075 includes four legs 1090 and barbs 1115, although fewer or more 1090 and barbs 1115 are possible.

Installation and removal of the plugs 275, 375, 475, 575, 675, 775, 875, 975, 1075 described with regard to FIGS. 6-19 is substantially the same as installation and removal of the plug 175 described with regard to FIGS. 2-5. More specifically, each plug 275, 375, 475, 575, 675, 775, 875, 975, 1075 is secured to the hole 140 in the rim by attaching the appropriate seal 180, 980 to the plug 275, 375, 475, 575, 675, 775, 875, 975, 1075 (either as a co-formed, co-molded, or separate element) and then inserting the legs 190, 990a, 990b, 1090 through the hole 140. The legs 190, 990a, 990b, 1090 bias inward so that the barbs 215, 1115 can fit through the hole 140. The cap 185, 285 385, 885, 985, 1085 is pressed downward so that the contact surface 220 is engaged with the inner edge 145. During and upon engagement, the seal 180, 980 is compressed between the cap 185, 285 385, 885, 985, 1085 and the outer surface 135 so that the plug 275, 375, 475, 575, 675, 775, 875, 975, 1075 tightly fits into and seals the hole 140. To remove the plug 275, 375, 475, 575, 675, 775, 875, 975, 1075, the edge or lip of the cap 185, 285 385, 885, 985, 1085, or another engagement feature 677, is grasped to pull the plug 185, 285 385, 885, 985, 1085 radially outward (upward as viewed in FIG. 2).

Although the plugs 175, 185, 285 385, 885, 985, 1085 illustrated in FIGS. 2-19 are described with regard to the seals 180, 980 being separately attached to the plugs 175, 185, 285 385, 885, 985, 1085 or co-formed with the plug 175, 185, 285 385, 885, 985, 1085, any or all of the plugs 175, 185, 285 385, 885, 985, 1085 can include a seal 180, 980 provided separate from or integrated into (e.g., co-molded, co-formed, etc.) the plug 175, 185, 285 385, 885, 985, 1085.

Various features of the invention are set forth in the following claims.

The invention claimed is:

1. A bicycle wheel comprising:
   a hub;
   a rim coupled to the hub and having an annular panel with inner and outer surfaces, the annular panel including an access hole defining inner and outer edges corresponding with the inner and outer surfaces, the access hole having a hole area sized to facilitate passage of a nipple; and
   a plug positioned over the access hole, the plug including:
      a cap having an upper surface and a lower surface, and a cap area larger than the hole area;
      a plurality of legs extending from the cap and through the access hole, the legs spaced apart from each other around the periphery of the cap such that gaps are defined between the legs; and
      a barb protruding radially from one or more of the legs to at least partially engage the inner edge of the annular panel,
      wherein each of the gaps extends from distal ends of adjacent legs toward the cap and terminates short of a plane defined by the lower surface; wherein the plug further includes a resilient member compressed between the cap and the outer surface of the annular panel; wherein the resilient member has an unstressed thickness, wherein the resilient member has a stressed thickness when compressed between the cap and the outer surface, and wherein the stressed thickness is 50 to 95 percent of the unstressed thickness; wherein each barb has a contact surface spaced from a lower surface of the cap by a distance, and wherein the distance corresponds to a thickness of the annular panel and the stressed thickness of the resilient member.

2. The bicycle wheel of claim 1, wherein the annular panel has a non-planar contour, and wherein the resilient member is shaped to match the non-planar contour of the annular panel.

3. The bicycle wheel of claim 1, wherein the cap has a cap width and the leg has a circumferential width that is less than half the cap width.

4. The bicycle wheel of claim 1, wherein a center of the cap has a thickness greater than an edge of the cap.

5. The bicycle wheel of claim 1, wherein the plug further includes a reinforcement rib.

6. The bicycle wheel of claim 1, wherein the plug further includes an alignment feature to orient the plug relative to the rim.

7. The bicycle wheel of claim 1, wherein the plug further includes an engagement feature that facilitates removal of the plug from the rim.

8. The bicycle wheel of claim 1, wherein the annular panel has a non-planar contour, and wherein the cap is shaped to match the non-planar contour of the annular panel.

* * * * *